(12) United States Patent
Cheng (10) Patent No.: US 9,054,580 B2
(45) Date of Patent: *Jun. 9, 2015

(54) REFERENCE VOLTAGE REGULATING METHOD AND CIRCUIT FOR CONSTANT CURRENT DRIVER

(71) Applicant: Silergy Semiconductor Technology (Hangzhou) LTD, Hangzhou, ZheJiang Province (CN)

(72) Inventor: Shuai Cheng, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/163,749

(22) Filed: Jan. 24, 2014

(65) Prior Publication Data

US 2014/0139134 A1      May 22, 2014

Related U.S. Application Data

(63) Continuation of application No. 13/654,610, filed on Oct. 18, 2012, now Pat. No. 8,686,706.

(30) Foreign Application Priority Data

Oct. 31, 2011    (CN) .......................... 2011 1 0338404

(51) Int. Cl.
  *G05F 3/04*     (2006.01)
  *H03B 1/00*     (2006.01)
  *H02M 3/156*    (2006.01)
  *H05B 33/08*    (2006.01)
  *H02M 7/217*    (2006.01)

(52) U.S. Cl.
  CPC ............ *H02M 3/156* (2013.01); *H05B 33/0827* (2013.01); *H02M 7/217* (2013.01); *H05B 33/0815* (2013.01)

(58) Field of Classification Search
  CPC ............. G05F 1/56; G05F 1/575; G05F 3/18; G05F 3/22; G05F 3/30; G05F 3/262; G05F 3/265; H03K 19/00361; H03K 17/04126
  USPC .......... 323/281, 311–313; 327/108, 109, 538; 315/307, 308
  See application file for complete search history.

(56) References Cited

U.S. PATENT DOCUMENTS 6,894,928 B2    5/2005    Owen
6,949,892 B2    9/2005    Horiuchi et al.
7,038,530 B2    5/2006    Chou
8,269,430 B2    9/2012    Nakai

(Continued)

*Primary Examiner* — Adolf Berhane
(74) *Attorney, Agent, or Firm* — Michael C. Stephens, Jr.

(57) ABSTRACT

The present invention relates to reference voltage regulating methods and circuits for a constant current driver. In one embodiment, a method can include: setting a reference voltage circuit matching with a current output channel of a constant current source; setting a first resistor of the reference voltage circuit to follow an ideal equivalent resistor of the current output channel, and maintaining a proportion of the first resistor and the ideal equivalent resistor to be no less than a predetermined value M; setting a first current of the reference voltage circuit to follow an ideal output current of the current output channel, and maintaining a proportion of the first current and the ideal output current to be no less than 1/M; and setting a product of the first current and the first resistor to be a reference voltage of the reference voltage circuit.

20 Claims, 9 Drawing Sheets

(56) References Cited

U.S. PATENT DOCUMENTS

| | | | |
|---|---|---|---|
| 8,314,757 B2 | 11/2012 | Osaka | |
| 8,686,706 B2 * | 4/2014 | Cheng | 323/311 |
| 2007/0069712 A1 | 3/2007 | Kamatani | |
| 2009/0195281 A1 | 8/2009 | Tamura et al. | |
| 2011/0128303 A1 | 6/2011 | Yonemaru et al. | |
| 2012/0126858 A1 | 5/2012 | Senda et al. | |
| 2013/0057175 A1 | 3/2013 | Chuang et al. | |

* cited by examiner

REFERENCE VOLTAGE REGULATING METHOD AND CIRCUIT FOR CONSTANT CURRENT DRIVER

RELATED APPLICATIONS

This application is a continuation of the following application, U.S. patent application Ser. No. 13/654,610, filed on Oct. 18, 2012, now issued as U.S. Pat. No. 8,686,706, and which is hereby incorporated by reference as if it is set forth in full in this specification, and which also claims the benefit of Chinese Patent Application No. 201110338404.8, filed on Oct. 31, 2011, which is incorporated herein by reference in its entirety.

FIELD OF THE INVENTION

The present invention relates to the field of power electronics, and more specifically to a reference voltage regulating methods and circuits for a constant current driver.

BACKGROUND

In order to keep light-emitting diode (LED) lights working in a stable state, a constant current source typically applied in LED drivers may meet two requirements: (i) its output current should be kept substantially constant; and (ii) power losses should be relatively low to obtain a relatively high system efficiency. In order to meet the first requirement, the output voltage of the constant current source may be kept higher than a threshold voltage for driving the constant current source steadily. Conventionally, the output voltage can be set according to a comparison of a sampling of an output voltage of the constant current source against a fixed reference voltage $V_{REF}$.

SUMMARY

In one embodiment, a reference voltage regulating method for a constant current driver, can include: (i) setting a reference voltage circuit matching with a current output channel of a constant current source in the constant current driver; (ii) setting a first resistor of the reference voltage circuit to follow an ideal equivalent resistor of the current output channel, and maintaining a proportion of the first resistor and the ideal equivalent resistor to be no less than a predetermined value M; (iii) setting a first current of the reference voltage circuit to follow an ideal output current of the current output channel, and maintaining a proportion of the first current and the ideal output current to be no less than 1/M; and (iv) setting a product of the first current and the first resistor to be a reference voltage of the reference voltage circuit, and setting a product of the ideal output current and the ideal equivalent resistor to be a threshold voltage of the constant current source, where the reference voltage is no less than the threshold voltage.

In one embodiment, a reference voltage regulating circuit for a constant current driver, can include: (i) a reference voltage circuit matching with a current output channel of a constant current source in the constant current driver, where a proportion of a first resistor of the reference voltage circuit and an ideal equivalent resistor of the current output channel is no less than a predetermined value M; (ii) an adjustable current source coupled to the reference voltage circuit, where a first current of the adjustable current source is configured to be regulated based on an ideal output current of the constant current source to maintain a proportion of the first current and the ideal output current to be no less than 1/M; and (iii) where a reference voltage is no less than a threshold voltage when the reference voltage denotes a product of the first current and the first resistor, and where the threshold voltage denotes a product of the output current and the ideal equivalent resistor.

In one embodiment, a constant current driver can include: (i) the reference voltage regulating circuit; (ii) a constant current source; (iii) a minimum voltage selector configured to select a minimum output voltage from output voltages of current output channels in the constant current source; (iv) an operation circuit coupled to the minimum voltage selector and the reference voltage regulating circuit, where the operation circuit is configured to generate a control signal; and (v) a converter configured to maintain the minimum output voltage of the constant current source to be no less than a threshold voltage such that the constant current source operates in a steady state.

Embodiments of the present invention can advantageously provide several advantages over conventional approaches. For example, a constant current source can be maintained to operate in a normal state, and the system efficiency can be improved by maintaining a reference voltage slightly higher than a threshold voltage of the constant current source. Also, the reference voltage can be regulated by a reference voltage regulating circuit. Other advantages of the present invention may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Further-more, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Embodiments of the present invention can advantageously provide several advantages over conventional approaches. For example, a constant current source can be maintained to operate in a normal state, and the system efficiency can be improved by maintaining a reference voltage slightly higher than a threshold voltage of the constant current source. Also, the reference voltage can be regulated by a reference voltage regulating circuit. The invention, in its various aspects, may be explained in greater detail below with regard to exemplary embodiments.

Figure 1:
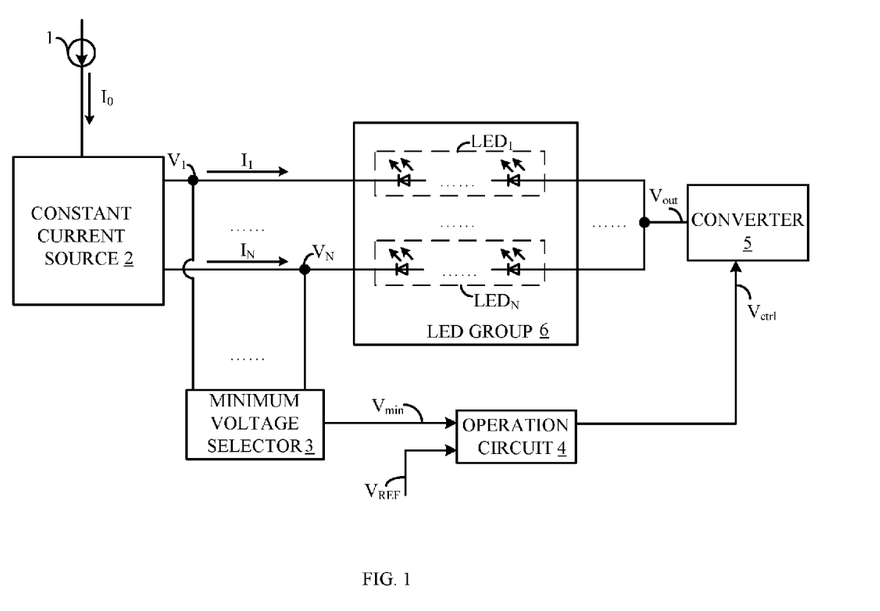
FIG. 1 is a schematic diagram of an example constant current source driver.

With reference to FIG. 1, shown is a circuit diagram of an example constant current driver. In this example, the constant current driver can include reference current source 1 that can be used to generate current $I_0$. The constant current driver can also include constant current source 2 that can be used to receive current $I_0$ and generate N output currents $I_1 \sim I_N$ for LED channels $LED_1 \sim LED_N$. Constant current source 2 can include N current output channels with the same or substantially similar circuit structures and being connected in parallel, where N can denote a number of light-emitting diode (LED) channels in LED group 6.

The constant current driver can also include minimum voltage selector 3 that can be used to select the minimum output voltage from output voltages $V_1 \sim V_N$ of current output channels and generate voltage signal $V_{min}$. The constant current driver can also include operation circuit 4 that can be used to receive voltage signal $V_{min}$ and reference voltage signal $V_{REF}$, and to generate control signal $V_{ctrl}$. The constant current driver can also include converter 5 that may be used to receive control signal $V_{ctrl}$. The constant current driver can also include LED group 6, where the positive terminals of LED channels in LED group 6 can be connected together to one terminal of converter 5.

In order to keep output currents $I_1 \sim I_N$ substantially constant, any of output voltages $V_1 \sim V_N$ of constant current source 2 may be larger (e.g., higher, or larger in absolute value) than a threshold voltage. In some applications, output voltages $V_1 \sim V_N$ may be different due to the different voltage drops on each LED channel. This can result in some output voltages of output channels being smaller than the threshold voltage to affect normal operation of constant current source 2. Thus, converter 5 can be used to regulate output voltage $V_{out}$ according to voltage signal $V_{min}$ to maintain any of output voltages $V_1 \sim V_N$ to be larger than the threshold voltage. In this example, current output channels of constant current source 2 can be formed by transistors, or a suitable combination of transistors and resistors.

When the circuit structures of each of the current output channels are the same, ideal output current I can be used instead of any output current from output currents $I_1 \sim I_N$, and ideal equivalent resistor $R_{HR}$ can be used instead of any equivalent resistor from equivalent resistor $R_{HR1} \sim R_{HRN}$ of the current output channels. Equivalent resistor $R_{HRN}$ can be equal to a sum of resistor $R_N$ of the $N_{th}$ current output channel, resistor $R_{QN}$ of transistor $Q_N$, and resistor $R_{MN}$ on metal wire of the $N_{th}$ current output channel (e.g., $R_{HRN}=R_N+R_{QN}+R_{MN}$). The threshold voltage of constant current source can be obtained by multiplying ideal output current I and ideal equivalent resistor $R_{HR}$, where the threshold voltage can be denoted by $V_{HR}$ (e.g., $V_{HR}=I\times R_{HR}$).

In some applications, ideal output current I of constant current source 2 may be different as LED group 6 may be working under different circumstances, and ideal equivalent resistor $R_{HR}$ can change when affected by temperature, process and working environment. Thus, any change of both ideal output current I and ideal equivalent resistor $R_{HR}$ may cause threshold voltage $V_{HR}$ to be different. For example, threshold voltage $V_{HR}$ may be higher when output current I may be relatively high or equivalent resistor $R_{HR}$ may be relatively high due to transistor process variations. In this case, reference voltage $V_{REF}$ can be set to be relatively high to ensure normal operation of constant current source 2. However, when ideal output current I is lower or ideal equivalent resistor $R_{HR}$ is relatively low, threshold voltage $V_{HR}$ may also be relatively low. In this case, the already set relatively large reference voltage $V_{REF}$ may cause output voltages $V_1 \sim V_N$ to be much larger than threshold voltage $V_{HR}$. Further, large differences between output voltages $V_1 \sim V_N$ and threshold voltage $V_{HR}$ may further increase power losses to reduce system efficiency.

In view of the above-mentioned drawbacks, particular embodiments can provide reference voltage regulating methods and circuits for a constant current driver. Particular embodiments can be used to achieve self-adjust of reference voltage $V_{REF}$ according to a variation of an output current and an equivalent resistor, and to increase system efficiency when an ideal output current or an ideal equivalent resistor is relatively small, but reference voltage $V_{REF}$ is relatively large.

In one embodiment, a reference voltage regulating method for a constant current driver, can include: (i) setting a reference voltage circuit matching with a current output channel of a constant current source in the constant current driver; (ii) setting a first resistor of the reference voltage circuit to follow an ideal equivalent resistor of the current output channel, and maintaining a proportion of the first resistor and the ideal equivalent resistor to be no less than a predetermined value M; (iii) setting a first current of the reference voltage circuit to follow an ideal output current of the current output channel, and maintaining a proportion of the first current and the ideal output current to be no less than 1/M; and (iv) setting a product of the first current and the first resistor to be a reference voltage of the reference voltage circuit, and setting a product of the ideal output current and the ideal equivalent resistor to be a threshold voltage of the constant current source, where the reference voltage is no less than the threshold voltage.

Figure 2:
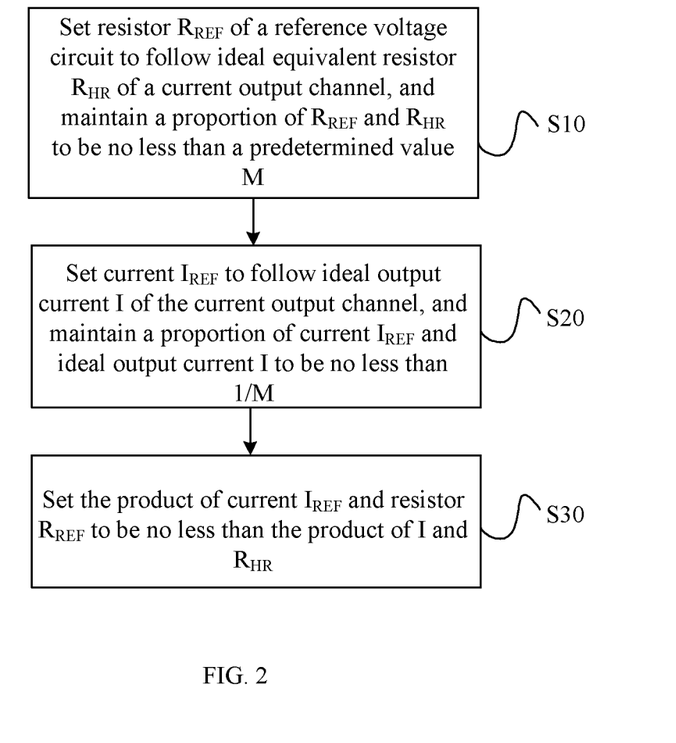
FIG. 2 is a flow chart of an example reference voltage regulating method in accordance with the embodiments of the present invention.

With reference to FIG. 2, shown is a flow diagram of an example reference voltage regulating method in accordance with embodiments of the present invention. In one example application of this method, a reference voltage circuit matching with the current output channel can be set in advance. Thus, the types and materials of components, and the circuit structure of the reference voltage circuit, can be the same, or substantially the same, as the current output channel.

In this example method at S10, resistor $R_{REF}$ of the reference voltage circuit can be set to follow ideal equivalent resistor $R_{HR}$ of a current output channel. Also, a proportion of resistor $R_{REF}$ and ideal equivalent resistor $R_{HR}$ can be maintained to be no less than a predetermined value M. At S20, receiving current $I_{REF}$ with the reference voltage circuit, current $I_{REF}$ can be set to follow ideal output current I. Also, a proportion of current $I_{REF}$ and ideal output current I can be maintained to be no less than 1/M. At S30, a product of current $I_{REF}$ and resistor $R_{REF}$ can be set to be no less than a product of output current I and equivalent resistor $R_{HR}$.

At S20, current $I_{REF}$ tracking of ideal output current I can include regulating current $I_{REF}$ when ideal output current I is changing, to maintain a proportion of current $I_{REF}$ and ideal output current I at no less than 1/M. Alternatively, or in addition, tracking of ideal output current I can include setting the proportion of current $I_{REF}$ and input current $I_0$ to be $K_1$, the proportion of ideal output current I and input current $I_0$ to be K, and maintaining the proportion of $K_1$ and K be no less than 1/M.

In this example method, the product of current $I_{REF}$ and resistor $R_{REF}$ can be denoted by reference voltage $V_{REF}$, and the product of ideal output current I and ideal equivalent resistor $R_{HR}$ can be denoted by threshold voltage $V_{HR}$. As the proportion of current $I_{REF}$ and ideal output current I can be no less than 1/M, and the proportion of resistor $R_{REF}$ and ideal equivalent resistor $R_{HR}$ can be no less than M, reference voltage $V_{REF}$ can be no less than threshold voltage $V_{HR}$.

In order to keep the constant current source functioning in a normal state, and to reduce power losses, reference voltage $V_{REF}$ may be larger than threshold voltage $V_{HR}$. However, more power may be wasted if reference voltage $V_{REF}$ is set too large, so reference voltage $V_{REF}$ may be slightly larger than threshold voltage $V_{HR}$. In one example reference voltage regulating method, reference voltage $V_{REF}$ can be larger than threshold voltage $V_{HR}$ by regulating resistor $R_{REF}$ to maintain the proportion of resistor $R_{REF}$ and ideal equivalent resistor $R_{HR}$ to be larger than M, and regulating current $I_{REF}$ to keep the proportion of current $I_{REF}$ and ideal output current I to be larger than 1/M.

For example, by setting the proportion of resistor $R_{REF}$ and equivalent resistor $R_{HR}$ to be (1.0~1.2)M, and by setting the proportion of current $I_{REF}$ and output current I to be (1.0~1.2)/M, reference voltage $V_{REF}$ can be (0~50%) larger than threshold voltage $V_{HR}$, where 0~20% is one preferred scope. When reference voltage $V_{REF}$ equals threshold voltage $V_{HR}$, the proportion of resistor $R_{REF}$ and equivalent resistor $R_{HR}$ can set to be M and the proportion of current $I_{REF}$ and ideal output current I can set to be 1/M. When reference voltage $V_{REF}$ is about 10% larger than threshold voltage $V_{HR}$, the proportion of resistor $R_{REF}$ and ideal equivalent resistor $R_{HR}$ can set to be about 1.1M, or the proportion of current $I_{REF}$ and ideal output current I can set to be about 1.1/M. When reference voltage $V_{REF}$ is about 20% larger than threshold voltage $V_{HR}$, the proportion of resistor $R_{REF}$ and ideal equivalent resistor $R_{HR}$ can be set to be about 1.2M, or the proportion of current $I_{REF}$ and ideal output current I can set to be about 1.2/M.

Under the above three circumstances, as well as other suitable circumstances, both of resistor $R_{REF}$ and current $I_{REF}$ can be regulated to get a proper relationship of reference voltage $V_{REF}$ and threshold voltage $V_{HR}$. In some applications, reference voltage $V_{REF}$ can be about (1.0~1.2) times of threshold voltage $V_{HR}$. Example methods for setting reference voltage $V_{REF}$ to be slightly larger than threshold voltage $V_{HR}$ can also include: setting a sum of reference voltage $V_{REF}$ and a fixed voltage $V_0$ to be the reference voltage of constant current source driver. Also, the fixed voltage $V_0$ can be set according to a user's requirement, such as about (0~20%) $V_{HR}$.

In one embodiment, a reference voltage regulating circuit for a constant current driver, can include: (i) a reference voltage circuit matching with a current output channel of a constant current source in the constant current driver, where a proportion of a first resistor of the reference voltage circuit and an ideal equivalent resistor of the current output channel is no less than a predetermined value M; (ii) an adjustable current source coupled to the reference voltage circuit, where a first current of the adjustable current source is configured to be regulated based on an ideal output current of the constant current source to maintain a proportion of the first current and the ideal output current to be no less than 1/M; and (iii) where a reference voltage is no less than a threshold voltage when the reference voltage denotes a product of the first current and the first resistor, and where the threshold voltage denotes a product of the output current and the ideal equivalent resistor.

Figure 3:
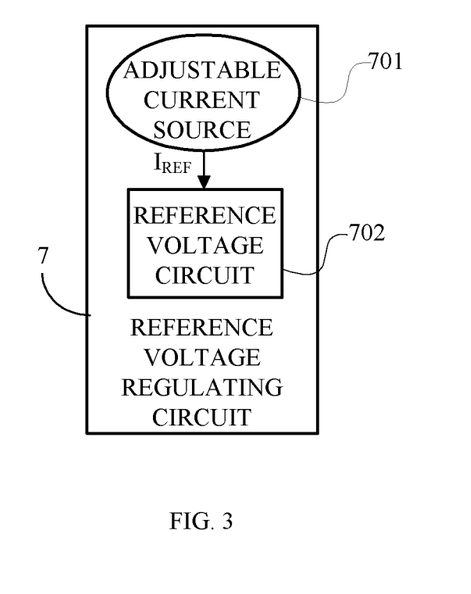
FIG. 3 is a structural diagram of an example reference voltage regulating circuit in accordance with embodiments of the present invention.

With reference to FIG. 3, shown is a structural diagram of an example reference voltage regulating circuit in accordance with embodiments of the present invention. In this example, reference voltage regulating circuit 7 can include adjustable current source 701 and reference voltage circuit 702. The output terminal of adjustable current source 701 can be connected with the input terminal of reference voltage circuit 702 to supply current $I_{REF}$ for reference voltage circuit 702. For example, the circuit structure and component types of reference voltage circuit 702 can match with a current output channel of constant current source 2.

Figure 4:
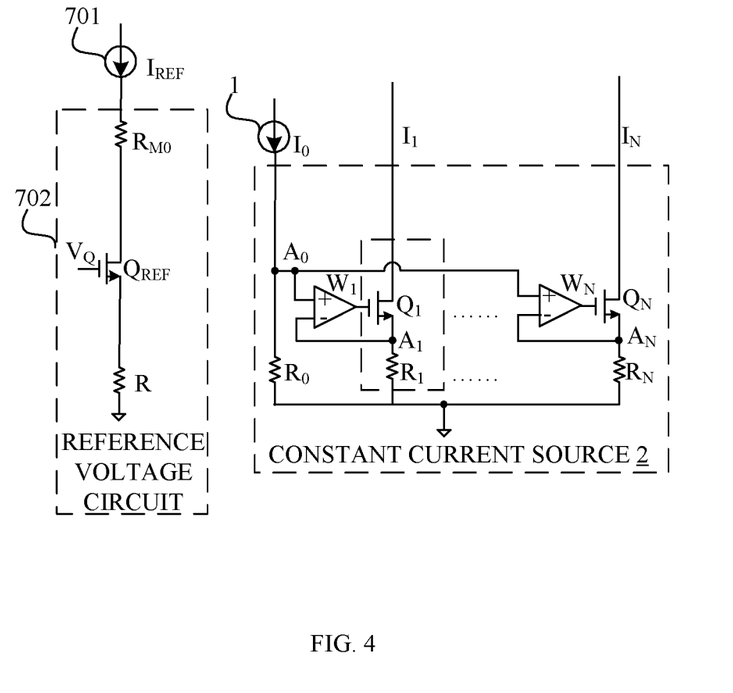
FIG. 4 is a schematic diagram of a first example reference voltage circuit in accordance with the embodiments of the present invention.

With reference to FIG. 4, shown is a schematic diagram of a first example reference voltage circuit in accordance with embodiments of the present invention. For example, such a reference voltage circuit may be in accordance with any channel of a constant current source formed by transistors. Constant current source 2 can include N current output channels of same structure, and N error amplifiers. The $N_{th}$ current output channel can include series connected transistor $Q_N$ and resistor $R_N$. The non-inverting terminal of error amplifier $W_N$ can connect to the common node $A_0$ of current source $I_0$ and resistor $R_0$. The inverting terminal of error amplifier $W_N$ can connect to the common node $A_N$ of transistor $Q_N$ and resistor $R_N$, and the output terminal of error amplifier $W_N$ can connect to the control terminal of transistor $Q_N$. The on-resistor of transistor $Q_N$ is denoted by $R_{ON}$.

Reference voltage circuit 702 can include series connected transistor $Q_{REF}$ and resistor R. The control terminal of transistor $Q_{REF}$ can be controlled by driving signal $V_Q$. Also, the on-resistor of transistor $Q_{REF}$ is denoted by $R_{QREF}$, and resistor R can match with resistor $R_N$ as transistor $Q_{REF}$ matches with transistor $Q_N$. Thus, $(R_{QREF}+R)/(R_{QN}+R_N)$ equals to (1.0~1.2)M. In this example voltage reference circuit, take reference voltage circuit 702 matching with the $N_{th}$ current output channel as an example to describe the operation in detail. Adjustable current source 701 can connect with the $N_{th}$ current output channel, when a working current of an LED load is changing, that is when output current $I_N$ of the $N_{th}$ current output channel is changing, current $I_{REF}$ can be regulated to keep the proportion of current $I_{REF}$ and output current $I_N$ to be (1.0~1.2)/M.

Reference voltage circuit 702 can also include compensating resistor $R_{M0}$, where compensating resistor $R_{M0}$ can be connected between adjustable current source 701 and reference voltage circuit 702 to compensate the parasitic resistor $R_{MN}$ on metal wire of the $N_{th}$ current output channel. In order to achieve a voltage of reference voltage circuit 702 to be no less than a threshold voltage, the proportion of compensating resistor $R_{M0}$ and the parasitic resistor $R_{MN}$ on a metal wire may be no less than 1/M. The supplemented compensating resistor $R_{M0}$ can therefore make reference voltage $V_{REF}$ more precise. From the example reference voltage regulating method and circuit in accordance with embodiments of the present invention, it can be known that reference voltage $V_{REF}$ may be used as the reference voltage of constant current source driver after being self-adjusted according to the variation of ideal threshold voltage $V_{HR}$.

In one embodiment, a constant current driver can include: (i) the reference voltage regulating circuit; (ii) a constant current source; (iii) a minimum voltage selector configured to select a minimum output voltage from output voltages of current output channels in the constant current source; (iv) an operation circuit coupled to the minimum voltage selector and the reference voltage regulating circuit, where the operation circuit is configured to generate a control signal; and (v) a converter configured to maintain the minimum output voltage of the constant current source to be no less than a threshold voltage such that the constant current source operates in a steady state.

Figure 5A:
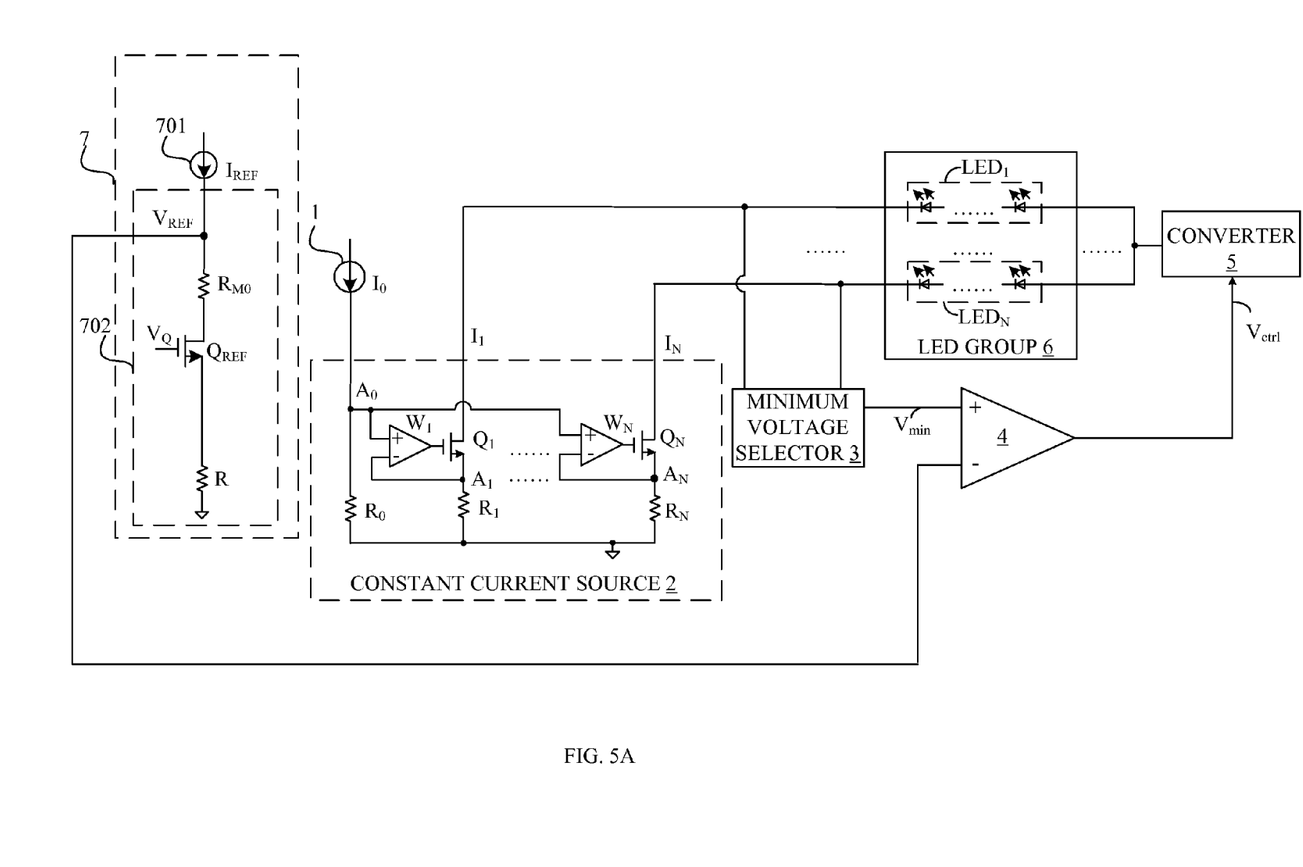
FIG. 5A is a schematic diagram of a first example constant current source driver by applying the example reference voltage circuit of FIG. 4.

With reference to FIG. 5A, shown is a schematic of a first example constant current source driver by applying the example reference voltage circuit of FIG. 4. As compared with the example constant current source driver shown in FIG. 1, this example constant current source driver can also include reference voltage regulating circuit 7. Reference voltage regulating circuit 7 can include adjustable current source 701 and reference voltage circuit 702. The components and structure of reference voltage circuit 702 and constant current source 2 can be the same or substantially similar as shown in FIG. 4.

The first input terminal of operation circuit 4 can connect with minimum voltage selector 3 to receive the minimum output voltage $V_{min}$ of output voltages of current output channels. The second input terminal of operation circuit 4 can connect to reference voltage circuit 702 to receive reference voltage $V_{REF}$, and the output terminal of operation circuit 4 can be used to generate a control signal $V_{ctrl}$ to converter. For example, operation circuit 4 can be formed by an operation amplifier or a comparator. Here, operation amplifier can be taken as an example to describe the circuit in detail. The operation amplifier can connect to minimum voltage selector 3 at its non-inverting input terminal to receive a minimum output voltage $V_{min}$ of current output channel, and can connect to reference voltage circuit 702 at its inverting input terminal to receive voltage $V_{REF}$. The output terminal of operation amplifier can then be used to generate a control signal $V_{ctrl}$ to converter 5. Converter 5 can regulate its output voltage $V_{out}$ according to the control signal $V_{ctrl}$ and maintain any of output voltage $V_1 \sim V_N$ of the current output channels to be larger than threshold voltage $V_{HR}$.

Figure 5B:
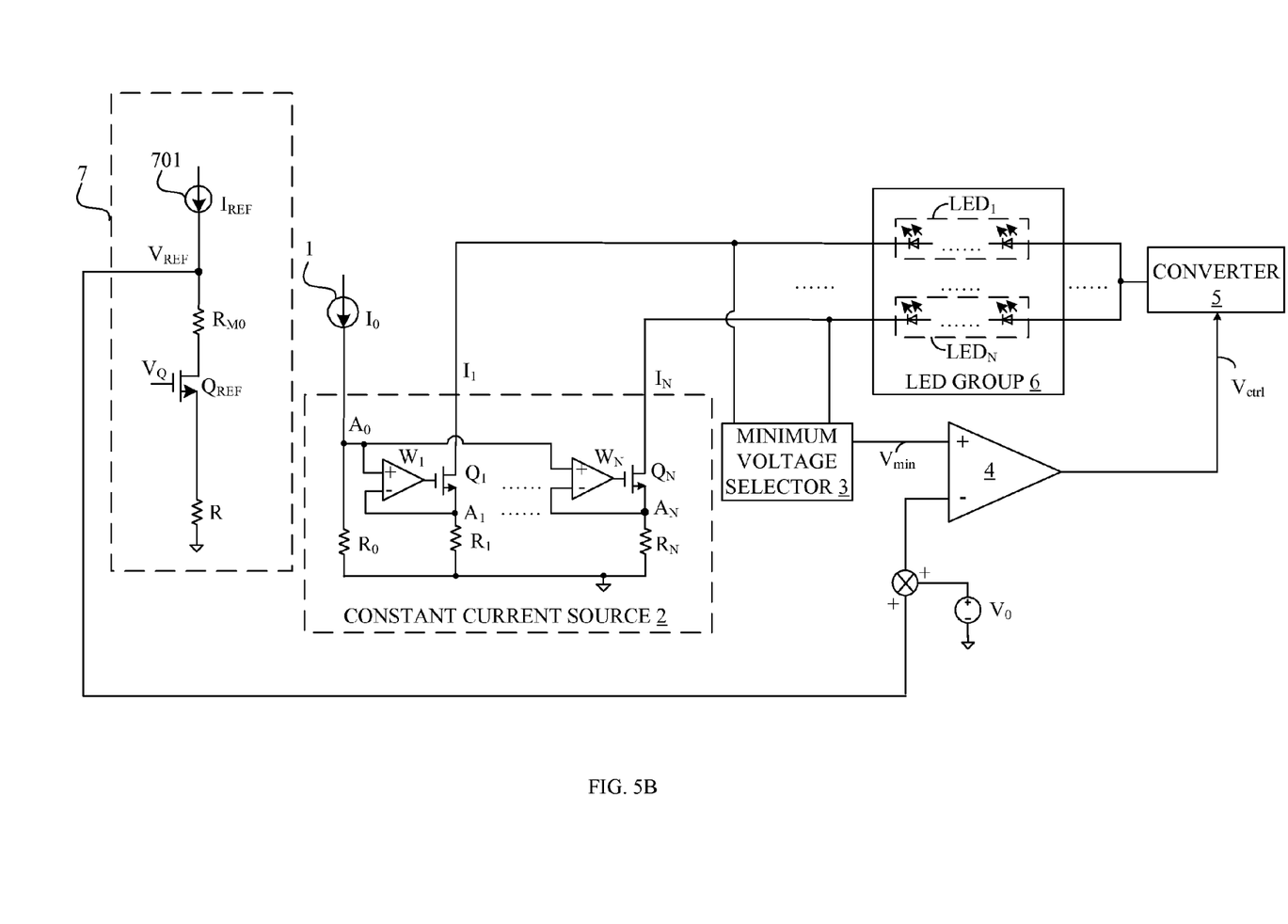
FIG. 5B is a schematic diagram of a second example constant current source driver by applying the example reference voltage of FIG. 4.

With reference to FIG. 5B, shown is a schematic of a second example constant current source driver by applying the reference voltage circuit shown in FIG. 4. Different from FIG. 5A, the second example constant current source driver can also include a voltage source of fixed voltage $V_0$, where the voltage source can connect to reference voltage circuit 702. The sum of voltage $V_{REF}$ and fixed voltage $V_0$ can be used as the reference voltage of the constant current driver, and fixed voltage $V_0$ can set to be about (0~20%) $V_{HR}$. By applying the constant current source driver shown in FIG. 5B, the reference voltage $V_{REF}$ at the inverting terminal of operation amplifier 4 can be slightly larger than ideal threshold voltage $V_{HR}$, even when voltage $V_{REF}$ is equal to ideal threshold voltage $V_{HR}$.

In these two example constant current source drivers as shown in FIG. 5A and FIG. 5B, the proportion of current $I_{REF}$ of reference voltage circuit 702 and input current $I_{REF}$ of constant current source 2 can set to be $K_1$, and the proportion of ideal output current I and input current $I_{REF}$ can be K. Then, the proportion of $K_1$ and K can set to be no less than M. for example, converter 5 can be a DC-DC converter, an AC-DC converter, a linear converter, or a charge pump circuit.

The reference voltage circuit in the example constant current source drivers can self-adjust reference voltage $V_{REF}$ according to threshold voltage $V_{HR}$ under different circumstances, and keep reference voltage $V_{REF}$ be about 1.0~1.2 times that of ideal threshold voltage $V_{HR}$ to ensure that reference voltage $V_{REF}$ is larger than ideal threshold voltage $V_{HR}$. In particular embodiments, the output voltage of the constant current source can be regulated through operation circuit 4 and converter 5. When ideal threshold voltage $V_{HR}$ is relative high due to the high output current of the constant current source and transistor process variability, reference voltage $V_{REF}$ can be regulated to be larger to keep any output voltage of the current output channel slightly larger than ideal threshold voltage $V_{HR}$ and maintain the constant current source operating in normal state.

When threshold voltage $V_{HR}$ is relative small due to the small output current of constant current source 2 or the normal process, reference voltage $V_{REF}$ can be regulated to be smaller to reduce the output voltage of current output channel but still maintained slightly larger than ideal threshold voltage $V_{HR}$. In this way, constant current source 2 can be kept working in a normal state, and the system efficiency can be improved as the problem of high power losses when reference voltage $V_{REF}$ is much larger than ideal threshold voltage $V_{HR}$ can be solved.

Figure 6:
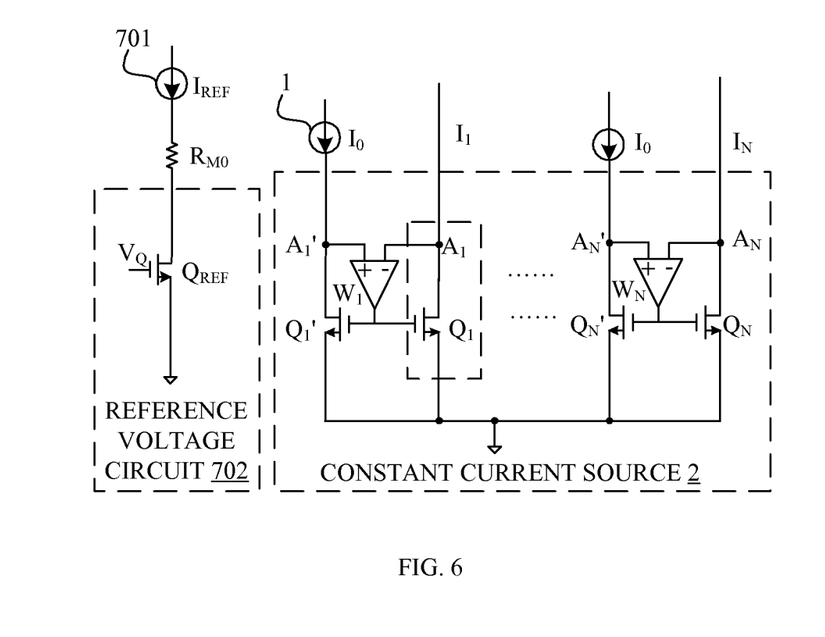
FIG. 6 is a schematic diagram of a second example reference voltage circuit in accordance with the embodiments of the present invention.

With reference to FIG. 6, shown is a schematic diagram of a second example reference voltage circuit in accordance with embodiments of the present invention. This second example reference voltage circuit is in accordance with another type of a constant current source formed by transistors. Constant current source 2 here can include N current output channels with a same structure, where the $N_{th}$ current output channel can include transistor $Q_N$, transistor $Q_{N'}$ which can be in mirror symmetry with transistor $Q_N$ and error amplifier $W_N$ (e.g., N is a positive integer greater than 1). Transistor $Q_{N'}$ can connect between current source $I_0$ and ground.

Error amplifier $W_N$ can connect to the common node $A_{N'}$ of current source $I_0$ and transistor $Q_{N'}$ at its non-inverting terminal, and can connect to the output terminal of the $N_{th}$ current output channel at its inverting terminal. The output terminal of error amplifier $W_N$ can connect to the control terminals of both transistor $Q_N$ and transistor $Q_{N'}$. The on-resistor of transistor $Q_N$ is denoted by $R_{QN}$. Also, reference voltage circuit 702 can include transistor $Q_{REF}$. One terminal of transistor $Q_{REF}$ can connect to current $I_{REF}$, the other terminal of transistor $Q_{REF}$ can connect to ground, and the control terminal can be used to receive driving voltage $V_Q$. The on-resistor of transistor $Q_{REF}$ is denoted by $R_{QREF}$, the proportion of $R_{QREF}$ and $R_{QN}$ may equal about 1.0~1.2 times of M as transistor $Q_{REF}$ is matching with transistor $Q_N$.

The operation principle of reference voltage circuit in FIG. 6 may be the same or substantially similar with the reference voltage circuit shown in FIG. 4. Similarly, the reference voltage circuit in FIG. 6 can also include compensating resistor $R_{M0}$ having the same function as described above.

Figure 7:
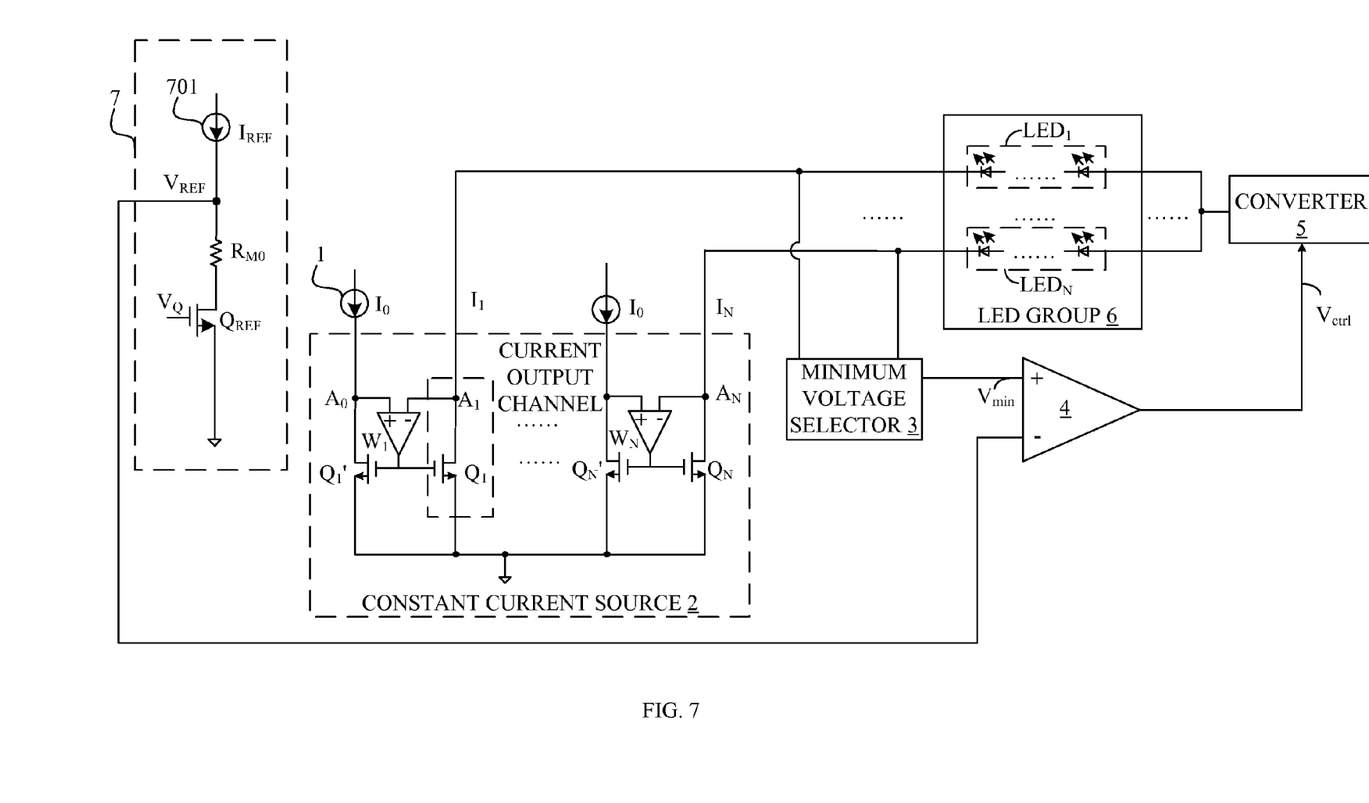
FIG. 7 is a schematic diagram of a third constant current source driver by applying the example reference voltage of FIG. 6.

With reference to FIG. 7, shown is a schematic diagram of a third constant current source driver by applying the example reference voltage of FIG. 6. In this third constant current source driver, a comparator can be taken as an example to form operation circuit 4. The non-inverting terminal of comparator can connect to minimum voltage selector 3 to receive any minimum output of all current output channels. The inverting terminal of comparator 4 can connect to reference voltage circuit 7 to receive voltage $V_{REF}$, and the output terminal can be used to generate control signal $V_{ctrl}$ for controlling converter 5.

Figure 8:
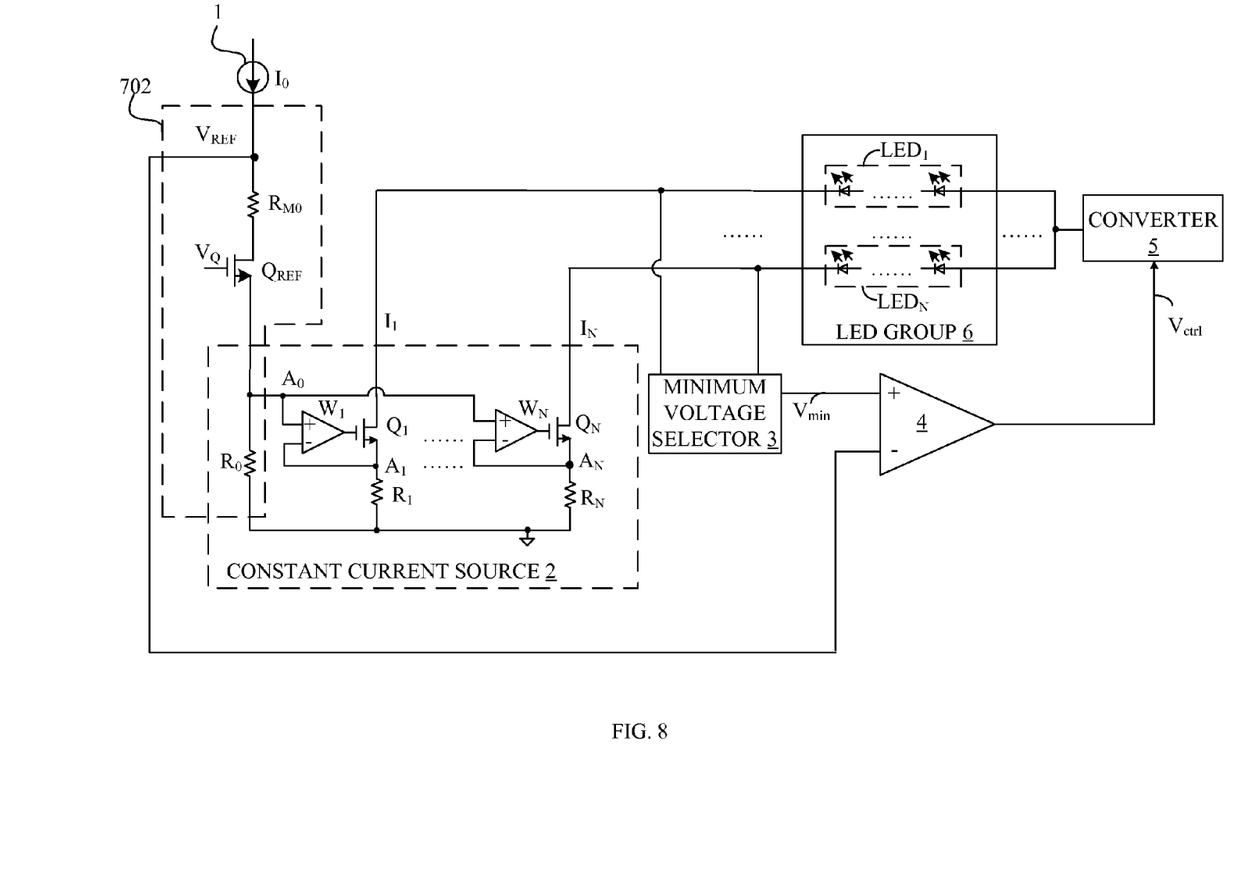
FIG. 8 is a schematic diagram of an improved constant current driver according to the example driver of FIG. 5A.

With reference to FIG. 8, shown is a schematic diagram of an improved constant current driver according to the example driver of FIG. 5A. Different from FIG. 5A, current source 1 of constant current source 2 can also be used as the reference current source of reference voltage circuit 702. This can result in the current $I_{REF}$ of reference voltage circuit 702 substantially equaling to input current $I_0$ of constant current source 2 (e.g., $I_{REF}=I_0$). Reference voltage circuit 2 here can include adjustable current source 1, transistor $Q_{REF}$, and resistor $R_0$.

According to the virtual-short property, the voltages on nodes $A_0$ and $A_N$ should be equal, so equation (1) can be derived as follows:

$$I_0 \times R_0 = I_N \times R_N \quad (1)$$

Then, equation (2) can be obtained as $I_{REF}=I_0$:

$$I_{REF} \times R_0 = I_N \times R_N \quad (2)$$

As the proportion of ideal output current I and current $I_{REF}$ is denoted by K, and $I_N$ can equal to I as structures of all current output channels may be the same, so equation (3) can be obtained:

$$I_N = K \times I_{REF} \quad (3)$$

Then equation (3) can be substituted into equation (2) to obtain equation (4):

$$R_0 = K \times R_N \quad (4)$$

As shown in FIG. 8, reference voltage $V_{REF}$ and the $N_{th}$ threshold voltage $V_{HRN}$ can be deduced according to equation (5) and equation (6):

$$V_{REF} = I_{REF} \times (R_{QREF} + R_0 + R_{M0}) \quad (5)$$

$$V_{HRN} = I_N \times (R_{QN} + R_N + R_{MN}) \quad (6)$$

When the components and structures of all current output channels are the same, $V_{HR}=V_{HRN}$.

As described before, it can be known that $R_{QREF}=K \times R_{QN}$, $R_{M0}=K \times R_{MN}$, $R_0=K \times R_N$ and $I_N=K \times I_{REF}$, then the relationship of reference voltage $V_{REF}$ and ideal threshold voltage $V_{HR}$ can be obtained in equation (7):

$$V_{REF} = V_{HR} \quad (7)$$

In order to ensure that constant current source 2 operates in a normal state, resistor $R_0$ and parasitic resistor $R_{M0}$ of reference voltage circuit 702 can be set to be about 1.0~1.2 times of the original value, to maintain reference voltage $V_{REF}$ be about 1.0~1.2 times of ideal threshold voltage $V_{HR}$.

It should be mentioned that the structure of constant current source 2 in the constant current driver can be any appropriate structure, but not limited to the examples described above. All the examples are only used to facilitate the description of the operation principle.

The foregoing descriptions of specific embodiments of the present invention have been presented through images and text for purpose of illustration and description of the voltage controlled current source circuit and method. They are not intended to be exhaustive or to limit the invention to the precise forms disclosed, and obviously many modifications and variations are possible in light of the above teaching, such as different implementations of the differentiating circuit and enabling signal generator.

The embodiments were chosen and described in order to best explain the principles of the invention and its some applications application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A reference voltage regulating method for a constant current driver, the method comprising:
   a) setting a first resistor of a reference voltage circuit to match an ideal equivalent resistor of a current output channel of a constant current source in said constant current driver;
   b) setting a first current of said reference voltage circuit to match an ideal output current of said current output channel;
   c) setting a product of said first current and said first resistor to be a reference voltage of said reference voltage circuit; and
   d) setting a product of said ideal output current and said ideal equivalent resistor to be a threshold voltage of said constant current source, wherein said reference voltage is no less than said threshold voltage.

2. The method of claim 1, wherein said reference voltage is used as a reference voltage of said constant current driver.

3. The method of claim 1, wherein a sum of said reference voltage and a fixed voltage is used as a reference voltage of said constant current driver.

4. The method of claim 1, further comprising:
   a) defining a proportion of said first current and an input current of said constant current source to be $K_1$;
   b) defining a proportion of said ideal output current and said input current to be K; and
   c) maintaining a proportion of $K_1$ and K to be no less than 1/M.

5. A reference voltage regulating circuit for a constant current driver, said reference voltage regulating circuit comprising:
   a) a reference voltage circuit matching with a current output channel of a constant current source in said constant current driver;
   b) an adjustable current source coupled to said reference voltage circuit, wherein a first current of said adjustable current source is configured to be regulated based on an ideal output current of said constant current source; and
   c) wherein a reference voltage is no less than a threshold voltage, wherein said reference voltage denotes a product of said first current and said first resistor, and wherein said threshold voltage denotes a product of said output current and said ideal equivalent resistor.

6. The reference voltage regulating circuit of claim 5, further comprising a voltage source with a fixed voltage, wherein said voltage source is coupled to said reference voltage circuit.

7. The reference voltage regulating circuit of claim 5, wherein said reference voltage circuit and said current output channel comprise same component types, materials, and circuit structures.

8. The reference voltage regulating circuit of claim 5, wherein a proportion of said first current and an input current of said constant current source is denoted by $K_1$, a proportion of said ideal output current and said input current is denoted by K, and a proportion of $K_1$ and K is configured to maintained to be no less than 1/M.

9. The reference voltage regulating circuit of claim 5, wherein said reference voltage regulating circuit further comprises a compensating resistor, said compensating resistor being coupled between said adjustable current source and said reference voltage circuit to compensate a parasitic resistor on metal wires of said current output channel.

10. A constant current driver, comprising:
 a) said reference voltage regulating circuit of claim 5;
 b) a constant current source;
 c) a minimum voltage selector configured to select a minimum output voltage from output voltages of current output channels in said constant current source;
 d) an operation circuit coupled to said minimum voltage selector and said reference voltage regulating circuit, wherein said operation circuit is configured to generate a control signal; and
 e) a converter configured to maintain said minimum output voltage of said constant current source to be no less than a threshold voltage such that said constant current source operates in a steady state.

11. The constant current driver of claim 10, wherein said operation circuit comprises an operational amplifier or a comparator.

12. The constant current driver of claim 10, wherein said converter comprises at least one of: a DC-DC converter, an AC-DC converter, a linear converter, and a charge pump circuit.

13. The constant current driver of claim 10, wherein an input current of said constant current source is configured to be used for both of said constant current source and said reference voltage regulating circuit.

14. The method of claim 1, further comprising:
 a) maintaining a proportion of said first resistor and said ideal equivalent resistor to be no less than a predetermined value M; and
 b) maintaining a proportion of said first current and said ideal output current to be no less than 1/M.

15. The method of claim 14, wherein said setting said first resistor to match said ideal equivalent resistor comprises setting said first resistor to be from about 1.0M to about 1.2M.

16. The method of claim 1, wherein said reference voltage is from about 0% to about 20% larger than said threshold voltage.

17. The method of claim 1, wherein said constant current driver is used for a light-emitting diode (LED) load.

18. The reference voltage regulating circuit of claim 5, wherein said adjustable current source is configured to:
 a) maintain a proportion of said first resistor and said ideal equivalent resistor to be no less than a predetermined value M; and
 b) maintain a proportion of said first current and said ideal output current to be no less than 1/M.

19. The reference voltage regulating circuit of claim 18, wherein said first resistor is set to be from about 1.0M to about 1.2M.

20. The reference voltage regulating circuit of claim 5, wherein said reference voltage is from about 0% to about 20% larger than said threshold voltage.

* * * * *